Jan. 18, 1949.  S. E. ROBBINS ET AL  2,459,288
RELEASABLE HOOK MEANS FOR FISH LURE
Filed Dec. 18, 1944
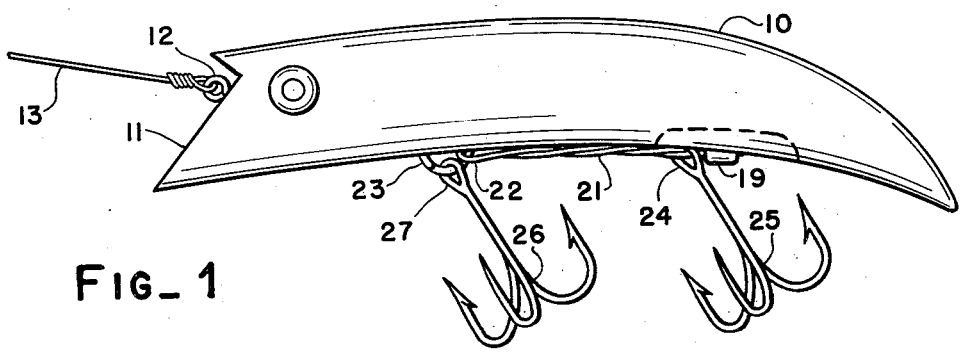
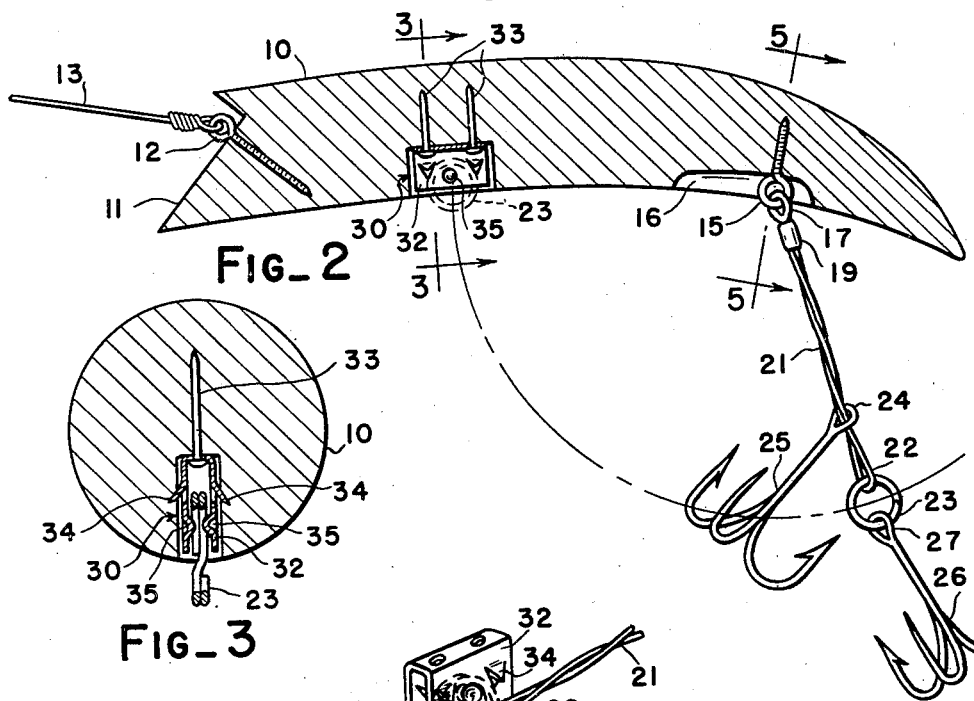
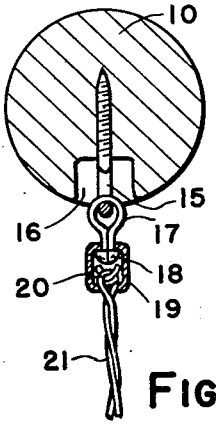
SAM E. ROBBINS
FRANK L. LARSON
Inventors
By Smith & Tuck
Attorneys Patented Jan. 18, 1949

2,459,288

UNITED STATES PATENT OFFICE 2,459,288

RELEASABLE HOOK MEANS FOR FISH LURE

Sam E. Robbins and Frank L. Larson,
Seattle, Wash.

Application December 18, 1944, Serial No. 568,669

2 Claims. (Cl. 43—46)

This invention relates to a releasable hook means for fish lures, and more particularly, to means for swingably attaching hooks to a fish lure, whereby, when a fish is engaged on one hook, a second hook will also engage and doubly secure the fish to the lure and trolling line.

With fishing plugs it is common to employ double or treble hooks which have heretofore been both fixedly and releasably attached to the plug body. In the case of the releasable arrangement, hooks are attached to a snood, which previously has been secured to the forward end of the plug, so that when the snood is released to swing, the hooks depend from the front part of the plug. This arrangement of forward attachment of the snood is not fully satisfactory for the reason that should a fish be snagged on the rear hooks of the plug, the release of the snood is rarely obtained or else only with great difficulty, thus defeating the primary purpose of releasing the snood so that both sets of hooks can engage in the fish.

Having in mind this and other defects of the prior art, it is an important object of our invention to design a releasable snood for fishing plugs, which snood can be freed no matter which of a double set of hooks happens to be engaged.

Another object of our invention lies in the provision, in a releasable hook means of the type described, of a novel securing member, which will releasably hold the snood in position, but will permit its separation from the plug body with ease on all occasions.

The foregoing objects and others ancillary thereto, we prefer to accomplish as follows:

According to a preferred embodiment of our invention, we dispose on the under side of a fishing plug adjacent the nose thereof, a clamping socket; to the rear of this socket a snood is attached to the fishing plug, and the snood carries thereon a free running gang of hooks intermediate its ends, as well as a split ring at the free end. Such ring also has secured thereon a second gang of hooks. The ring is engagable in the clamping socket member above described, and when so engaged, will hold the gangs of hooks in proper relation, spaced apart from each other, on the under side of the fishing plug. Means is provided adjacent the point of attachment of the snood at the rear of the plug to prevent the forward shifting of the rear gang of hooks under normal trolling conditions, but this means may be overcome when a fish is hooked, so that not only can the hook gang slide forward on the snood, but ready dislodgement of the ring from the clamping socket is effected so that the other gang of hooks can swing into operative position.

The novel features that we consider characteristic of our invention are set forth with particularity in the appended claims. The invention itself, however, both as to its organization and its method of operation, together with additional objects and advantages thereof, can best be understood from the following description of a specific embodiment when read in connection with the accompanying drawings, in which:

Fig. 1 is a view in side elevation of a fishing plug having our invention embodied therein;

Fig. 2 is a longitudinal sectional view of the plug of Fig. 1, with the releasable hooking means disengaged and swung downward therefrom;

Fig. 3 is a transverse sectional view taken on line 3—3 of Fig. 2;

Fig. 4 is a fragmentary perspective view of the clamping socket with the releasable ring engaged therein; and Fig. 5 is a transverse sectional view taken on line 5—5 of Fig. 2.

A releasable means for fishing plugs, to overcome the defects present in the prior art, must have at least two totally distinct characteristics; it must be capable of holding the hooks properly positioned along the length of a fishing plug in order to insure the fullest possibility of catching fish; and it must also be readily reasonable but only under conditions as when a fish is hooked, in order to bring the two gangs of hooks into simultaneous hooking engagement with the fish.

Accordingly, a preferred embodiment of our invention, referring to Figs. 1 and 2 of the drawings, is constituted by a fishing plug having a body 10, whose forward deflection face 11 is provided with an eye 12 for the attachment of trolling line 13, whereby the plug is drawn through the water to perform its function of luring fish thereto and for its further operation of carrying the gangs of hooks to catch such a fish.

By means of a screw eye 15 engaged in the rear of the body, in the depression 16, a swivel eye 17 is attached. The shank of the eye 17 has enlarged head 18 which is rotatably mounted in the swivel barrel 19 that is shaped to receive the knot 20 on snood 21. Preferably, the snood 21 is formed of a pair of strands of twisted wires or cord in a bight 22, in which is secured the split ring 23. Mounted to freely run on the snood 21 is eye 24 of the gang 25 of fishing hooks. The ring 23 carries the gang 26 of hooks by means of eye 27 which may be secured to or removed from the ring, since the same is split in the form of a double helical coil.

Between the point of attachment of the trolling line and the point of attachment of the snood 21 on the under side of the plug body 10 is cavity 30 into which is fitted the U-shaped spring clamp 32 that is mounted in an inverted position. Pins 33 serve to hold member 32 in place. The downwardly directed open mouth of member 32 receives the ring 23 to hold the snood line closely under the belly of the fish lure. To assist in the anchoring of the clamping member 32 the sides are punched to form outstanding and downwardly directed teeth 34 which bite into the body of the plug in the manner disclosed in Fig. 3. The walls of the U-shaped member 32 have inwardly directed opposed protuberances 35 spaced apart a distance somewhat less than the thickness of ring 23, whereby the latter may be interposed between the protuberances 35 to retain the same in place.

It is an observed fact that most fish will strike at a plug near its forward end. In such cases, with the present plug, the hook gang 26 would snag into the fish, and due to the threshing of the fish in the water, the ring 23 will be withdrawn from clamp 32. The snood 21 then swings to the position shown in Fig. 2, at which time the hook gang 25 will descend freely on the snood and further snag the fish.

Normally, the mechanism is assembled as shown in Fig. 1. Hook gang 25 cannot travel forward on the snood because the eye 24 comes against the forward lip of depression 16 which serves as an abutment against which the eye 24 strikes if there is a tendency for it to move forward. This function can be overcome when a fish is caught initially on the gang of hooks 25. Then when the fish threshes in the water, even if the ring 23 does not easily come loose from the clamp 32, the eye 24 of hook gang 25 would be displaced forward to a point where sufficient leverage would be applied to dislodge the ring, so that hook gang 26 can also engage in the fish. The amount of pressure required to retain the ring 23 in clamp 32 is normally fairly slight, but this can be varied by the fisherman in his well known custom of tinkering with his gear, merely by distorting the jaws of the clamp 32 one way or the other.

Once a fish has been caught and landed it will be obvious that the hooks merely need be disengaged from the fish's mouth or body and the ring re-inserted in clamp 32, and the plug is ready to be trolled again.

While we have shown and described particular embodiments of our invention, it will occur to those skilled in the art that various changes and modifications may be made without departing from the invention, and we therefore aim in the appended claims to cover all such changes and modifications as fall within the true spirit and scope of our invention.

Having thus described our invention, we claim:

1. A fishing plug, comprising: an elongated body having an under socket adjacent the forward portion of said body, a spring clamp mounted in said socket, said body having a depression adjacent the rear underside thereof, a snood having one end attached to said body in said depression and having a ring on the other end, said ring being insertable in said spring clamp whereby the same is releasably retained, said snood being of a length that when said ring is secured in said spring clamp the snood lies snugly against the underside of the body and tightly against the forward lip of said depression, hook means slidably carried by said snood in said depression, and hook means carried by said ring.

2. A fishing plug, comprising: an elongated body having an under socket adjacent the forward portion thereof, a snood having one end attached to the rear portion of said body and a ring on the other end, means in said socket to receive and releasably retain said ring whereby the snood is stretched below and along said body, hook means slidably carried by said snood, and hook means carried by said ring.

SAM E. ROBBINS.
FRANK L. LARSON.

REFERENCES CITED

The following references are of record in the file of this patent:

UNITED STATES PATENTS

| Number | Name | Date |
|---|---|---|
| 1,033,464 | Pomeroy | July 23, 1912 |
| 1,200,135 | Reynolds | Oct. 3, 1916 |
| 1,698,735 | Roberts | Jan. 15, 1929 |
| 2,017,903 | Johnson | Oct. 22, 1935 |
| 2,246,757 | Rosegard | June 24, 1941 |
| 2,275,869 | Seaton | Mar. 10, 1942 |

FOREIGN PATENTS

| Number | Country | Date |
|---|---|---|
| 19,132 | Great Britain | 1903 |